(12) United States Patent
Porter et al.

(10) Patent No.: US 11,606,930 B2
(45) Date of Patent: *Mar. 21, 2023

(54) TOOTHED PET GROOMING TOOL WITH FUR EJECTING MECHANISM

(71) Applicant: Spectrum Brands, Inc., Middleton, WI (US)

(72) Inventors: David R. Porter, Sunset Hills, MO (US); Angela L. Porter, Sunset Hills, MO (US)

(73) Assignee: Spectrum Brands, Inc., Middleton, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/498,398

(22) Filed: Oct. 11, 2021

(65) Prior Publication Data

US 2022/0022420 A1 Jan. 27, 2022

Related U.S. Application Data

(60) Continuation of application No. 14/745,655, filed on Jun. 22, 2015, now Pat. No. 11,147,239, which is a continuation of application No. 12/719,583, filed on Mar. 8, 2010, now Pat. No. 9,060,496, which is a division of application No. 11/942,231, filed on Nov. 19, 2007, now Pat. No. 8,960,129.

(51) Int. Cl.
*A01K 13/00* (2006.01)
(52) U.S. Cl.
CPC ............ *A01K 13/002* (2013.01); *A01K 13/00* (2013.01)

(58) Field of Classification Search
CPC ...... A01K 13/002; A01K 13/00; A45D 24/04; A45D 24/10
See application file for complete search history.

(56) References Cited

U.S. PATENT DOCUMENTS

| | | |
|---|---|---|
| 441,136 A | 11/1890 | Clements |
| 588,352 A | 8/1897 | Powell |
| 819,790 A | 5/1906 | Neste |
| 926,766 A | 7/1909 | Rauh |
| 992,250 A | 5/1911 | Rauh |
| 1,155,247 A | 9/1915 | Kellett |
| 1,339,863 A | 5/1920 | Rechter |
| 2,486,203 A | 10/1949 | Pieper |
| 3,059,260 A | 10/1962 | Peilet |
| 3,368,554 A | 2/1968 | Chou |
| 4,001,910 A | 1/1977 | Peilet |
| 4,162,554 A | 7/1979 | Peilet |
| 4,412,365 A | 11/1983 | Schmitt |

(Continued)

FOREIGN PATENT DOCUMENTS

| | | |
|---|---|---|
| JP | 61-35607 | 3/1986 |
| JP | 3-122720 | 12/1991 |

(Continued)

*Primary Examiner* — Son T Nguyen
(74) *Attorney, Agent, or Firm* — Merchant & Gould P.C.

(57) ABSTRACT

A pet grooming tool is provided with a fur ejector portion that is at least partially movable relative to the teeth of the pet grooming tool and can be manually moved into engagement with fur that is wedged or lodged between the teeth. The engagement of the fur ejector portion with the fur forces the fur from the gaps between the teeth. Preferably, the fur ejector portion can be manually moved by the same hand a person uses to support and hold the grooming tool.

10 Claims, 12 Drawing Sheets

(56) References Cited

U.S. PATENT DOCUMENTS

| | | |
|---|---|---|
| 4,567,905 A | 2/1986 | Stewart et al. |
| 4,596,261 A | 6/1986 | Renda et al. |
| 5,267,528 A | 12/1993 | Murieen |
| 5,815,877 A | 10/1998 | Heneveld |
| 5,862,563 A | 1/1999 | Hartmann |
| 6,070,594 A | 6/2000 | Mears |
| 6,421,872 B1 | 7/2002 | Sciandivasci |
| 6,427,633 B1 | 8/2002 | Ogden |
| 6,595,219 B2 | 7/2003 | Anderson |
| 6,631,831 B1 | 10/2003 | Loiselle |
| 6,782,846 B1 | 8/2004 | Porter et al. |
| 6,968,848 B2 | 11/2005 | Grant et al. |
| 7,077,076 B2 | 7/2006 | Porter et al. |
| 7,222,588 B2 | 5/2007 | Porter et al. |
| 7,334,540 B2 | 2/2008 | Porter et al. |
| 7,509,926 B2 | 3/2009 | Porter et al. |
| 7,854,214 B2 | 12/2010 | Khubani et al. |
| 8,960,129 B2 | 2/2015 | Porter et al. |
| 9,060,496 B2 | 6/2015 | Porter et al. |
| 2003/0172947 A1 | 9/2003 | Wang |
| 2005/0055788 A1 | 3/2005 | Chang et al. |
| 2006/0207623 A1 | 9/2006 | Kung |
| 2007/0033758 A1 | 2/2007 | Wang |
| 2008/0078333 A1 | 4/2008 | Wang |

FOREIGN PATENT DOCUMENTS

| | | |
|---|---|---|
| JP | 04190725 | 7/1992 |
| JP | 6-38666 | 5/1994 |
| JP | 3014899 | 8/1995 |
| JP | 10-28615 | 2/1998 |
| JP | 2001000068 | 1/2001 |
| JP | 3092121 | 2/2003 |
| JP | 3125661 | 9/2006 |

TOOTHED PET GROOMING TOOL WITH FUR EJECTING MECHANISM

CROSS-REFERENCE TO RELATED APPLICATIONS

This application is a continuation of U.S. Ser. No. 14/745,655, filed Jun. 22, 2015, which is a continuation of U.S. Ser. No. 12/719,583, filed Mar. 8, 2010, now U.S. Pat. No. 9,060,496, which is a divisional of U.S. Ser. No. 11/942,231, filed Nov. 19, 2007, now U.S. Pat. No. 8,960,129, which applications are incorporated herein by reference.

BACKGROUND OF THE INVENTION

1. Field of the Invention

This invention relates generally to pet grooming tools and, more particularly, to toothed pet grooming tools of the type used to remove loose fur (i.e., fur that is not attached to the skin) from the coat of a pet.

2. Related Art

Various types of pet grooming tools have been developed for the specific purpose of removing loose fur from the coats of pets. One of the most successful types of such grooming tools is described in U.S. Pat. Nos. 7,222,588, 7,077,076, and 6,782,846 and comprises a plurality of teeth arranged in a row. While such tools are effective in removing loose fur from pets, fur may become wedged or lodged between the gaps formed between the teeth of such tools and removing the such fur from the pet grooming tool can, in some cases, be somewhat time consuming. Typically, when fur becomes wedged in such a tool, the person using the tool simply closes his or her hand over the teeth and then pulls the fur out of the gaps. While this is a relatively simple action, it can be cumbersome when a person is using one hand to hold his or pet in place and therefore doesn't have a free hand. Additionally, some people find touching loose fur unpleasant.

SUMMARY OF THE INVENTION

The methods and pet grooming tools of the present invention improve the usability of pet grooming tools by providing a pet grooming tool with a fur ejector portion that is at least partially movable relative to the teeth of a pet grooming tool and can be manually moved into engagement with fur that is wedged between the teeth. The engagement of the fur ejector portion with the wedged fur forces the fur from the gaps between the teeth. Preferably the fur ejector portion can be manually moved by the same hand a person uses to support and hold the grooming tool.

In one aspect of the invention, a pet grooming tool comprises a toothed portion and a fur ejector portion. The toothed portion comprises a plurality of teeth arranged in a row and a plurality of edge segments. Gaps lie between each adjacent pair of the teeth. The edge segments of the toothed portion are adapted to engage loose fur in a pet's coat as such loose fur extends through the gaps in a manner removing the loose fur from the pet's coat. The fur ejector portion comprises an edge that is movable between a first position and a second position relative to the toothed portion. The edge of the fur ejector portion is biased from the second position toward the first position such that an external force is required to move the edge of the fur ejector portion from the first position to the second position. The fur ejector portion is configured and adapted to permit fur to pass through the gaps of the toothed portion when the edge of the fur ejector portion is in the first position. The edge of the fur ejector portion is adapted to slidably contact the teeth of the toothed portion and to contact fur passing through the gaps of the toothed portion in a manner forcing fur from the gaps of the toothed portion as the fur ejector portion moves away from the first position toward the second position.

In another aspect of the invention, a method of removing loose fur from a pet comprises a step of providing a pet grooming tool. The pet grooming tool comprises a toothed portion, a handle portion, and a fur ejector portion. The toothed portion comprises a plurality of teeth arranged in at least one row and a plurality of edge segments. A gap exists between each adjacent pair of the teeth. The fur ejector portion comprises an edge which is movable between a first position and a second position relative to the toothed portion. The method further comprises a step of moving the teeth of the toothed portion relative to a pet's coat by applying an external force to the handle portion while the fur ejector portion is in the first position. The movement causes a portion of loose fur of the pet's coat to pass into the gaps between the teeth of the toothed portion and causes the edge segments of the toothed portion to contact the portion of loose fur in a manner removing the portion of loose fur from the pet's coat. Still further, the method comprises a step off applying an external force to the pet grooming tool in a manner moving the edge of the fur ejector portion away from the first position toward the second position. The movement of the edge of the fur ejector portion away from the first position toward the second position causes the edge of the fur ejector portion to contact fur passing through the gaps of the toothed portion in a manner forcing such fur from the gaps of the toothed portion.

In yet another aspect of the invention, a method of modifying a pet grooming tool comprises a step of providing a pet grooming tool. The pet grooming tool comprises a handle portion, a toothed portion, and a first screw. The toothed portion comprises a plurality of teeth. A gap exists between each adjacent pair of the teeth. The handle portion is in contact with the toothed portion and is removably attached thereto via at least the first screw. The method further comprises a step of attaching a fur ejector portion to the pet grooming tool by removing the first screw from the pet grooming tool, sandwiching the fur ejector portion between the handle portion and the toothed portion, and securing the fur ejector portion to the handle portion and to the toothed portion via at least a second screw. The fur ejector portion comprises an edge which is movable between a first position and a second position relative to the toothed portion when attached thereto. The fur ejector portion is configured and adapted to permit fur to pass through the gaps of the toothed portion when the edge of the fur ejector portion is in the first position. The edge of the fur ejector portion is adapted to engage fur passing through the gaps of the toothed portion in a manner forcing fur from the gaps of the toothed portion as the fur ejector portion moves toward the second position.

Further features and advantages of the present invention, as well as the operation of various embodiments of the present invention, are described in detail below with reference to the accompanying drawings.

Figure 1:
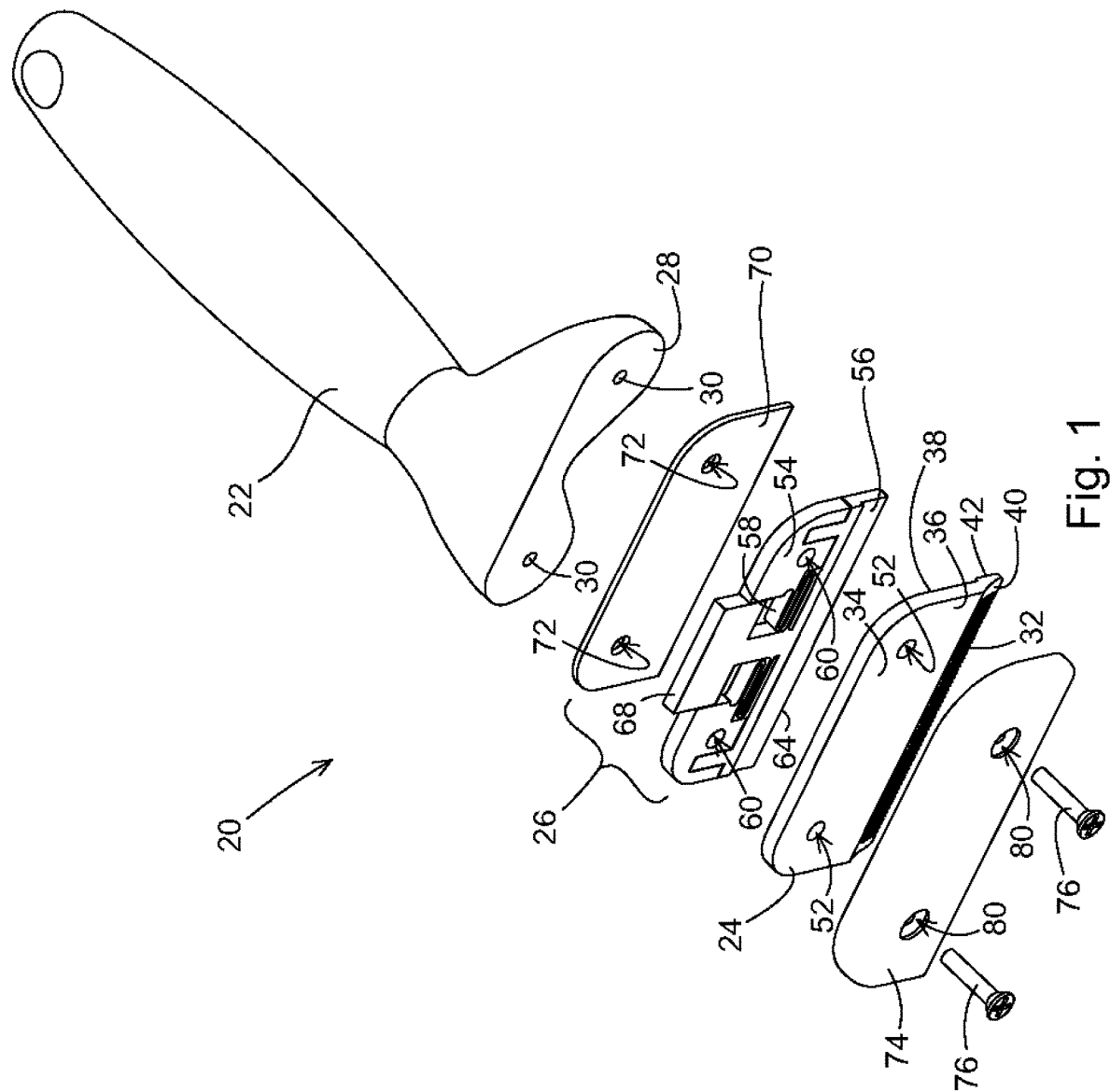
FIG. 1 illustrates a perspective exploded assembly view of a pet grooming tool in accordance with the invention.

Reference numerals in the written specification and in the drawing figures indicate corresponding items or steps.

DETAILED DESCRIPTION OF THE PREFERRED EMBODIMENT

Figure 2:
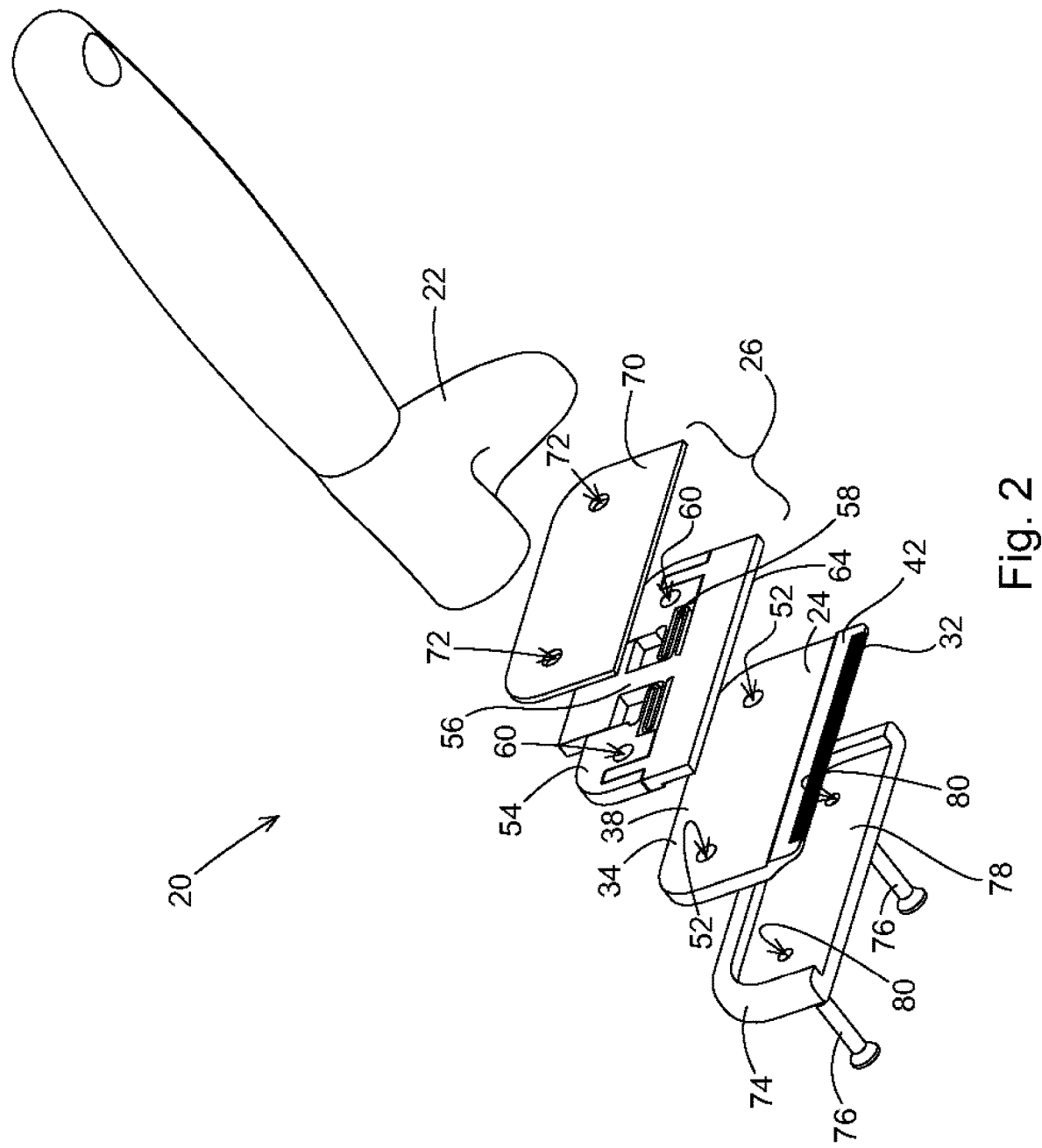
FIG. 2 illustrates another perspective exploded assembly view of the tool shown in FIG. 1.
Figure 3:
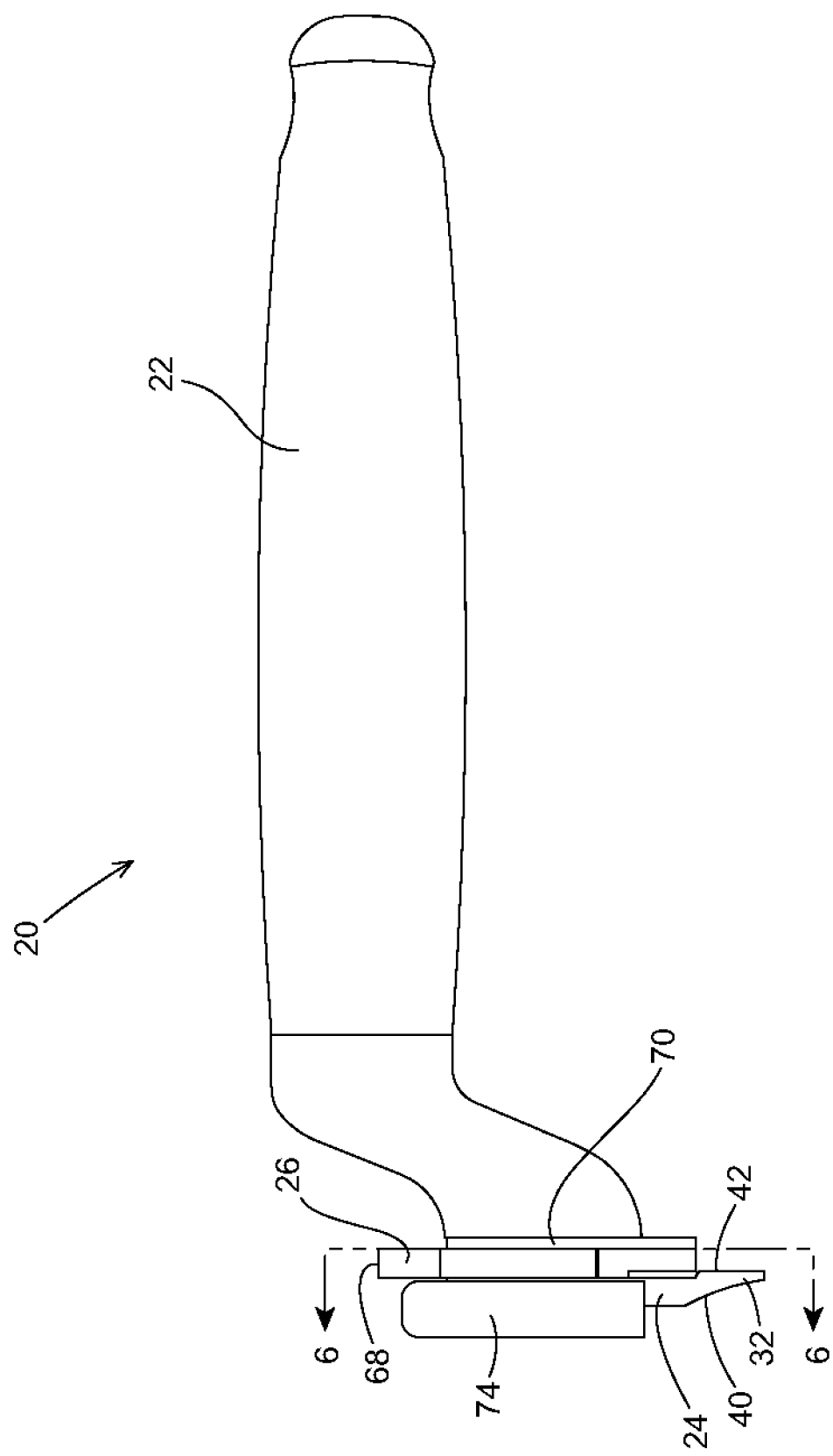
FIG. 3 illustrates a right side elevation view of tool shown FIGS. 1 and 2.
Figure 4:
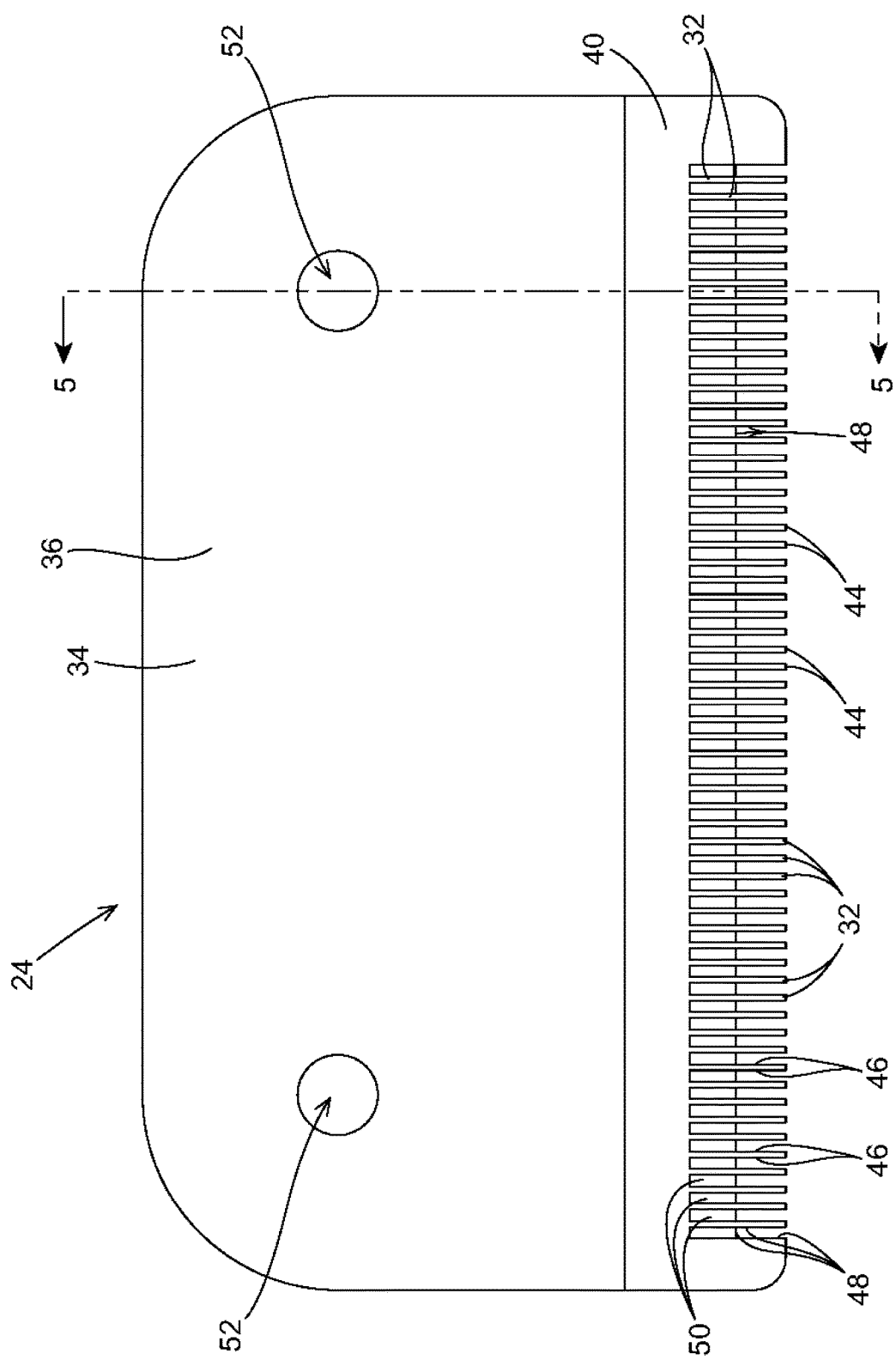
FIG. 4 illustrates a front elevation view of the toothed portion of the tool shown in FIGS. 1-3.
Figure 5:
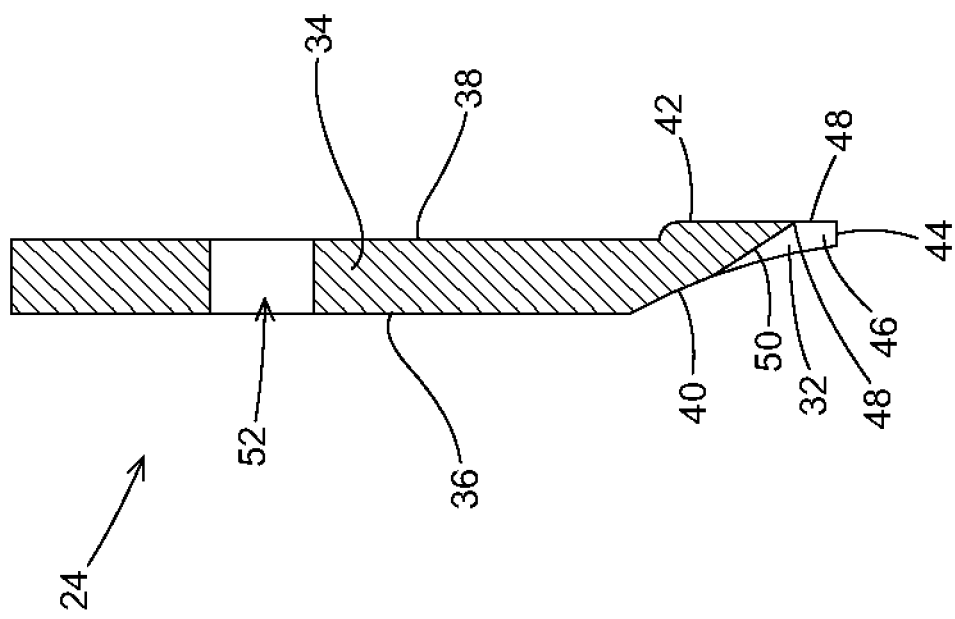
FIG. 5 illustrates a cross-sectional view of the toothed portion of the tool shown in FIGS. 1-3, taken about the line 5-5 shown in FIG. 4.

An embodiment of a pet grooming tool in accordance with the invention is shown in FIGS. 1-3. The pet grooming tool 20 comprises a handle portion 22, a toothed portion 24, and a fur ejector portion 26. Preferably, but not necessarily, the handle portion 22, toothed portion 24, and fur ejector portion 26 are formed as individual parts that are separable from each other.

The handle portion 22 is configured to be held in one hand and is preferably elongate about a longitudinal axis. Preferably, the handle portion 22 is formed primarily of a relatively rigid plastic and has a softer rubbery grip portion. The handle portion 22 also preferably comprises a bearing surface 28 at one of its longitudinal ends. Two threaded holes 30 extend into the handle portion 22 from the bearing surface 28. Preferably the threaded holes 30 are formed by threaded metal inserts.

The toothed portion 24 of the pet grooming tool 20 is preferably formed of metal and comprises a plurality of teeth 32. The teeth 32 preferably form a straight row. Preferably, the toothed portion 24 comprises a main body 34 having opposite forward facing 36 a rearward facing 38 surfaces. The forward facing 36 and rearward facing 38 surfaces are preferably parallel planar surfaces. The teeth 32 preferably extend from a front surface 40 to a back surface 42. The front surface 40 preferably tapers toward the back surface 42 as said surfaces extend toward the tips 44 of the teeth 32. Preferably the sides 46 of the teeth 32 intersect the back surface 42 in a manner forming a plurality of edge segments 48. The edge segments 48 formed by the sides 46 of the teeth 32 have an angle of approximately ninety degrees. Forward facing surface segments 50 extend between the teeth 32 and intersect the back surface 42 in manner forming additional edge segments 48. The edge segments 48 formed by the forward facing surface segments 50 are preferably significantly acute (≈40 degrees or less). The toothed portion 24 also preferably comprises a pair of through holes 52 that extend through its main body 34.

The fur ejector portion 26 preferably comprises a fixed portion 54, a movable portion 56, and a biasing portion 58 that are preferably formed together as a monolithic piece of homogeneous plastic. The fixed portion 54 of the fur ejector portion 26 preferably comprises a pair of through holes 60 that extend through the thickness of the fur ejector portion. The fixed portion 54 also comprises a plurality of guide surfaces 62. The movable portion 56 has a thickness that is slightly less than that of the fixed portion 54 and comprises a front edge 64 that is preferably linear and oriented perpendicular to the guide surfaces 62 of the fixed portion 54. The movable portion 56 also preferably comprises a plurality of guide surfaces 65. The biasing portion 58 preferably comprises a pair of resilient bridges 66 that connect the movable portion 56 to the fixed portion 54. The resilient bridges 66 are relatively slim and nonlinear such that they can flex relatively easily without fracturing or fatiguing. Preferably, part of the movable portion 56 of the fur ejector portion 22 forms an actuation button 68. The fur ejector portion 26 of the pet grooming tool 20 also preferably comprises a fur guard 70, which is preferably a piece of plastic sheet having two through holes 72.

The pet grooming tool 20 described above also preferably comprises a trim cap 74 and two screws 76. The trim cap 72 is preferably a piece of plastic having a recess 78 that is dimensioned to receive the main body 34 of the toothed portion 24 of the pet grooming tool 20. The trim cap 72 also has two countersunk through holes 80.

The pet grooming tool 20 is assembled by placing the fur guard 70 against the bearing surface 28 of the handle portion 22, with the through holes 72 of the fur guard 70 aligned with the threaded holes 30 of the handle portion. The fixed portion 54 of the fur ejector portion 26 is then placed against the fur guard 70 with its through holes 60 also aligned with the threaded holes 30 of the handle portion 22. Similarly, the toothed portion 24 of the pet grooming tool 20 is placed against the fur ejector portion 26 with its through holes 52 aligned with the threaded holes 30 of the handle portion 22. Additionally, the trim cap 74 is placed against the toothed portion 24 with the main body 34 of the tooth portion positioned in the recess 78 of the trim cap and the countersunk through holes 80 of the trim cap aligned with the threaded holes 30 of the handle portion 22. The screws 76 are then aligned with the threaded holes 30 of the handle portion 22 and are threaded thereinto, thereby clamping the components of the pet grooming tool 20 to one another. As assembled, the trim cap 74 conceals the main body 34 of the toothed portion 24, thereby improving the aesthetics of the pet grooming tool 20. Additionally, the fur guard 70 prevents fur from becoming lodged between the movable portion 56 and the fixed portion 54 of the fur ejector portion 26, where it could otherwise interfere with the proper operation of the fur ejector portion and make the pet grooming tool 20 difficult to clean.

Figure 6:
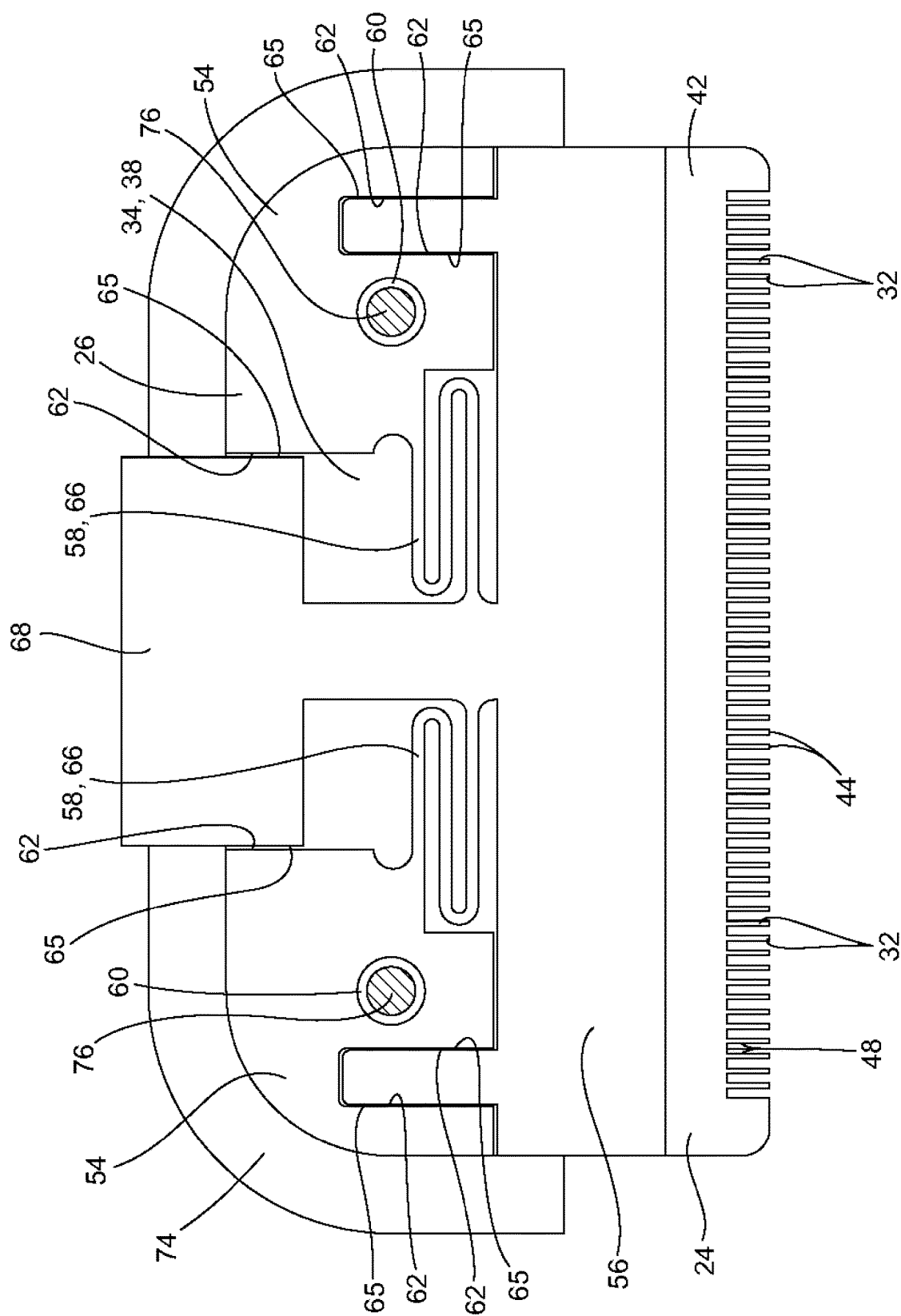
FIG. 6 illustrates a cross-sectional view of the tool shown in FIGS. 1-3, taken about the line 6-6 shown in FIG. 3, and is shown with the edge of the fur ejector portion in the first position.
Figure 7:
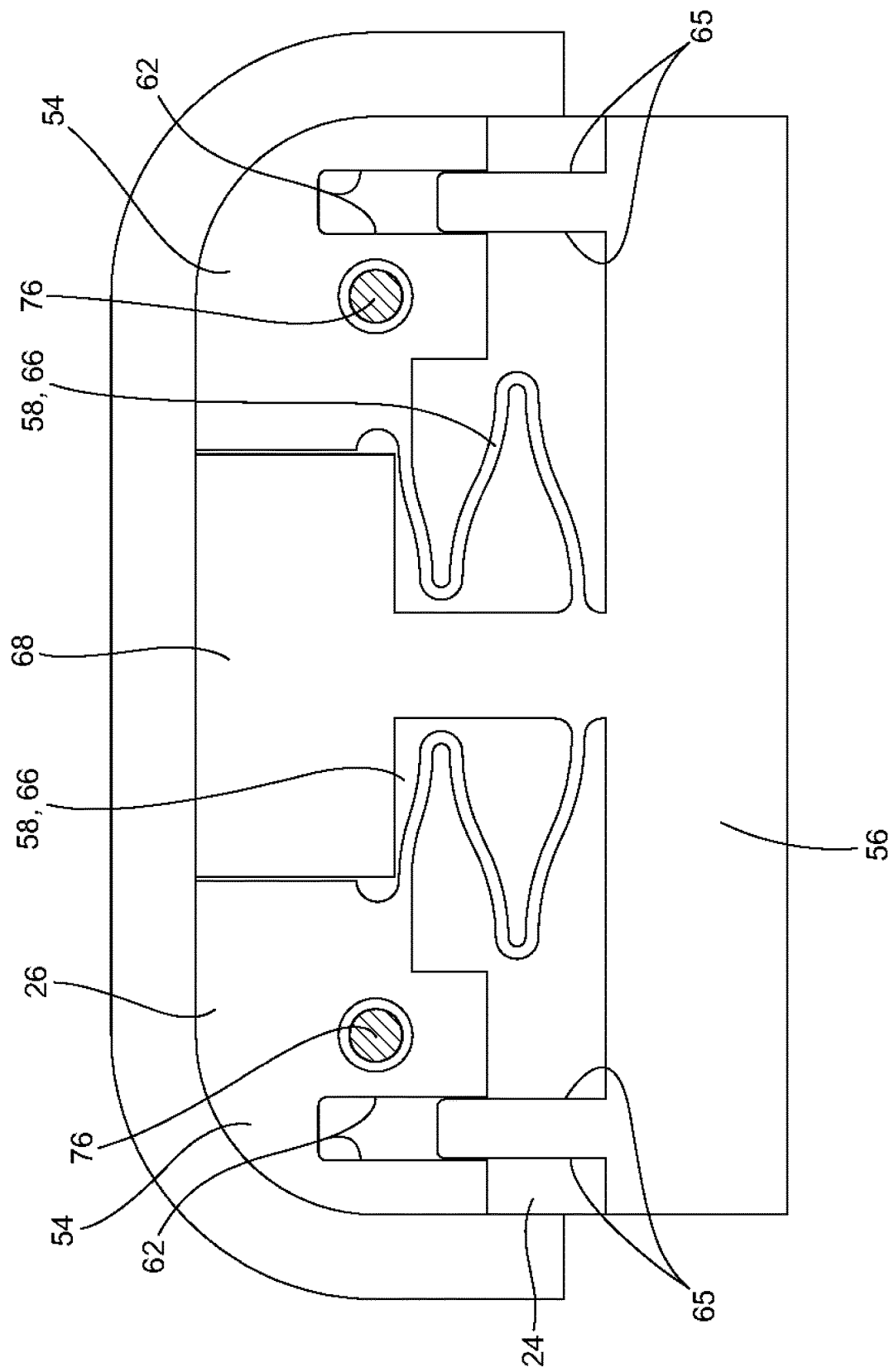
FIG. 7 illustrates a cross-sectional view similar to FIG. 6, but is shown with the edge of the fur ejector portion in the second position.
Figure 8:
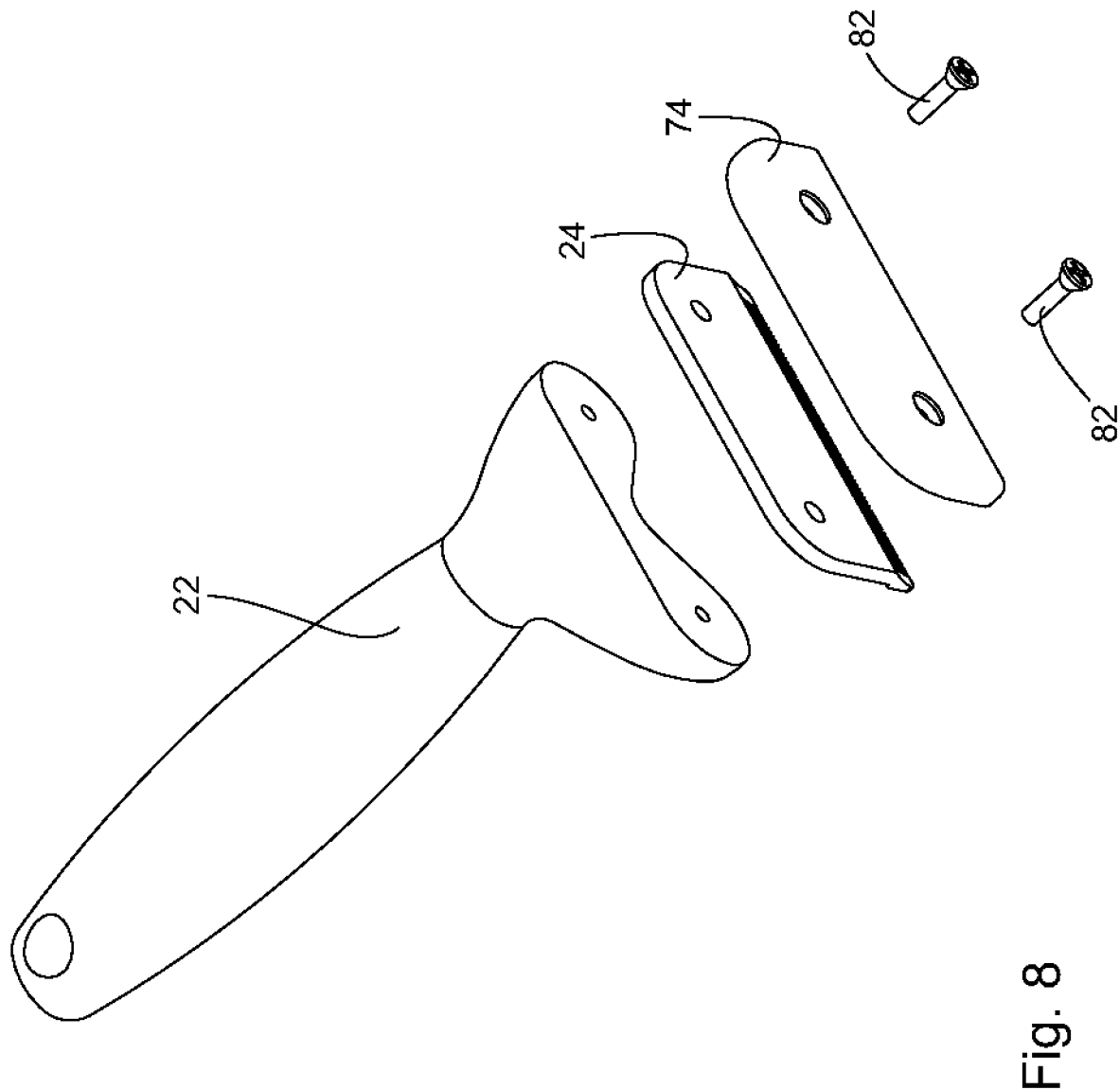
FIG. 8 illustrates a perspective exploded assembly view of the pet grooming tool shown in FIGS. 1-3, with the fur ejecting portion removed therefrom.

In use, the teeth 32 of the toothed portion 24 of the pet grooming tool 20 are preferably pulled through the coat of a furry pet by grasping the handle portion 22 and applying a force thereto. As the teeth 32 of the toothed portion 24 is pulled through the pet's coat, the front surface 40 of the toothed portion trails the back surface 42. During this process, the edge segments 48 of the toothed portion 24 of the pet grooming tool 20 grab loose fur within the pet's coat and force said loose fur from the coat. This effectively removes loose fur from the pet's coat. However, some of loose fur may become lodged in the gaps between the teeth 32 of the toothed portion 24. To remove the lodged fur, the person using the pet grooming tool 20 presses his or her thumb against the actuation button 68 of the fur ejector portion 26, which is otherwise biased by the biasing portion 58 in the first position shown in FIG. 6. The resulting force on the fur ejector portion 26 causes the resilient bridges 66 of the biasing portion 58 of the fur ejector portion to bend and expand such that the movable portion 56 moves toward the tips 44 of the teeth 32 of the toothed portion 24 as shown in FIG. 7 (the second position). During such movement, the edge 64 of the movable portion 56 of the fur ejector portion 26 slidably moves against the back surface 42 of the toothed portion 24 of the pet grooming tool 20 and against the edge segments 48. As such any fur that is lodged in the gaps between the teeth 32 of the toothed portion 24 of the pet grooming tool 20 is forced toward the tips 44 of the teeth and is thereby ejected from the pet grooming tool. Once released, the resiliency of the biasing portion 58 causes the resilient bridges 66 to return to their undeflected configuration, which causes the movable portion 56 of the fur ejector portion 26 to return to its first position relative to the toothed portion 24 of the pet grooming tool 20.

It should be appreciated that, because the fixed portion 54 of the fur ejector portion 26 is thicker than the movable portion 56 of the fur ejector portion, the movable portion is not clamped by the screws 76. It should also be appreciated that the guide surfaces 62 of the fixed portion 54 of the fur ejector portion 26 slidably engage against the guide surfaces 65 of the movable portion 56 of the fur ejector portion, thereby controlling the direction in which the movable portion moves relative to the toothed portion 24 of the pet grooming tool 20 when the actuation button 68 is pressed.

Figure 9:
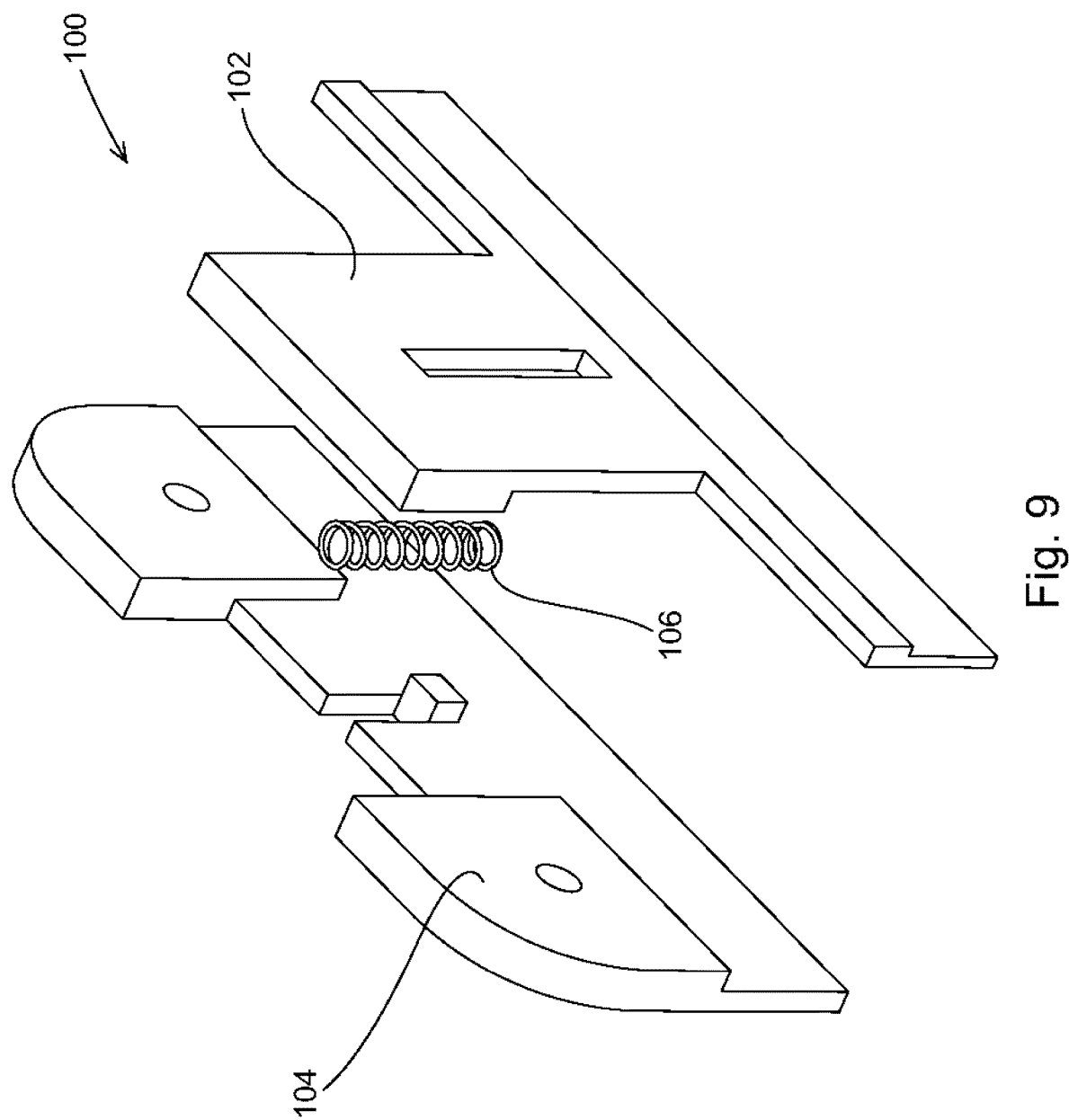
FIG. 9 illustrates a perspective exploded assembly view of an alternative embodiment of a fur ejector portion of a pet grooming tool in accordance with the invention.
Figure 10:
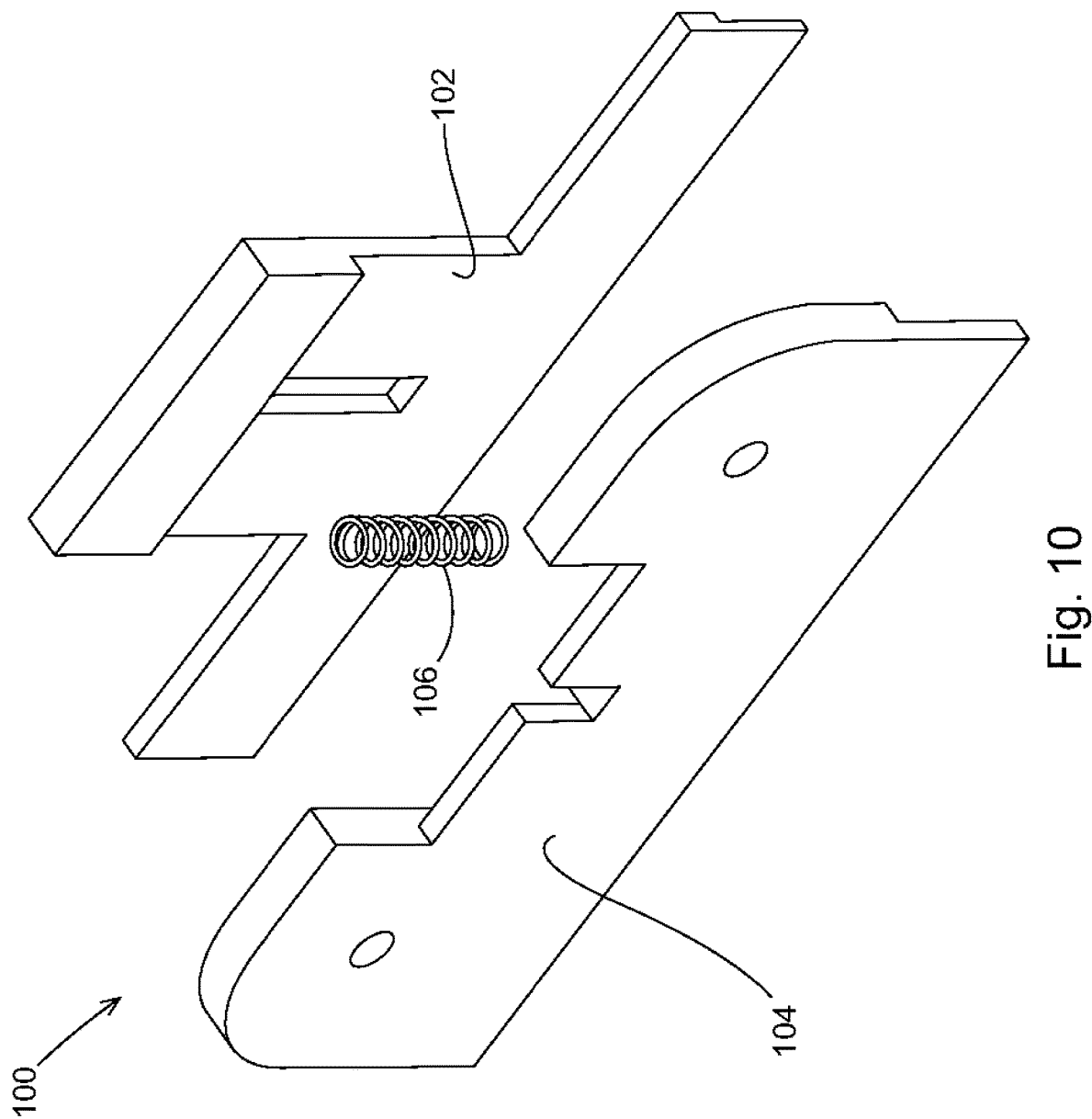
FIG. 10 illustrates another perspective exploded assembly view of the fur ejector portion shown in FIG. 9.
Figure 11:
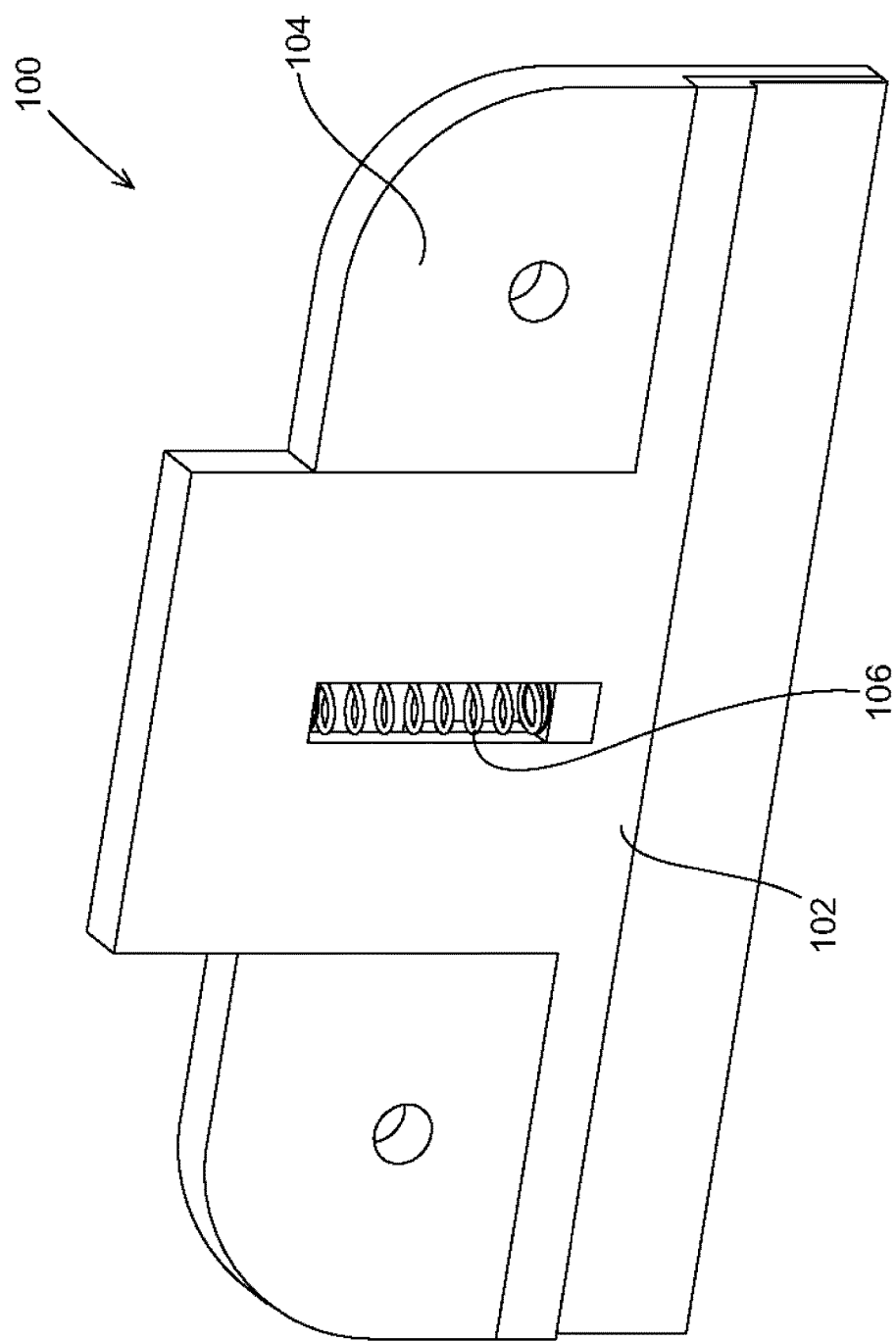
FIG. 11 illustrates a perspective assembly view of the fur ejector portion shown in FIGS. 9 and 10, with the edge of the fur ejector portion in the first position.
Figure 12:
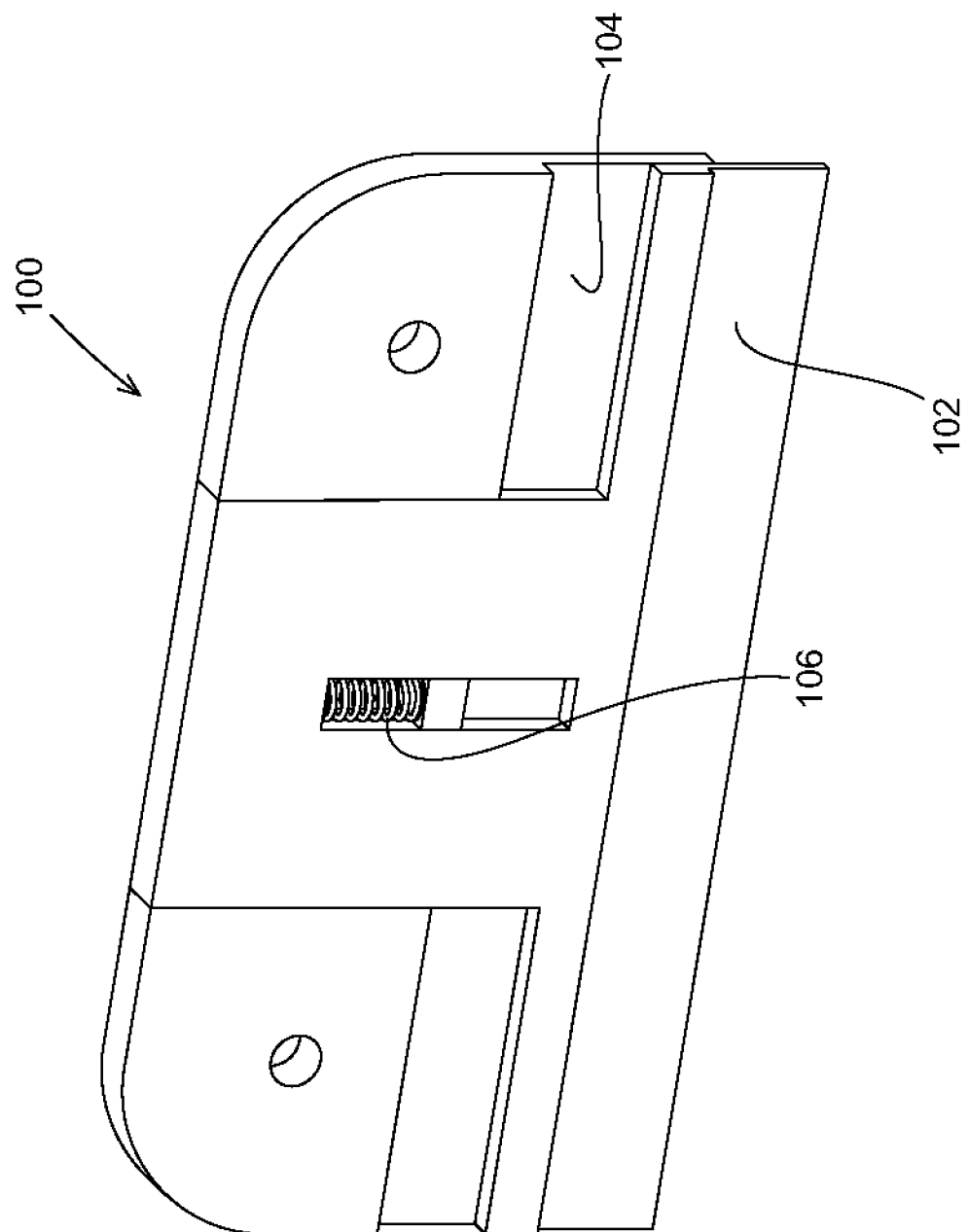
FIG. 12 illustrates a perspective assembly view of the fur ejector portion shown in FIGS. 9-11, with the edge of the fur ejector portion in the second position.

The fur ejector portion 26 of the pet grooming tool 20 described above is configured and adapted to be removed from the pet grooming tool. This is done by removing the screws 76 from the pet grooming tool 20 and then removing the fur ejector portion 26, including the fur guard 70. The rearward facing surface 38 of the toothed portion 24 of the pet grooming tool 20 can then be placed directly against the bearing surface 28 of the handle portion 22. A second set of screws 82, which are slightly shorter than the screws described above, can then be used to secure the remaining components together, as shown in FIG. 9. Similarly, this process can be reversed to add the fur ejector portion 26 to a similar pet grooming tool that initially lacks a fur ejector portion.

An alternative embodiment of a fur ejector portion is shown in FIGS. 9-12. This alternative fur ejector portion 100 is interchangeable with the fur ejector portion 26 described above and preferably comprises separate movable 102 and fixed 104 portions and a biasing portion that is in the form of a standard compression coil-spring 106. The fixed 102 and movable 104 portions are configured to interlocked with each other when they are sandwiched between the handle portion and the toothed portion of a pet grooming tool, albeit the movable portion can reciprocate between first and second positions (FIGS. 11 and 12 respectively) relative to the toothed portion. The coil-spring 88 biases the movable portion 82 toward the first position, and the fur ejector portion 80 otherwise operates similarly to the fur ejector portion 26 described in the preceding paragraphs.

In view of the foregoing, it will be seen that the several advantages of the invention are achieved and attained.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A method of removing loose fur from a pet, the method comprising:
   (a) providing a toothed portion comprising a main body with a forward face and an opposite rear face; the toothed portion having a back surface and an opposite front surface, the toothed portion comprising a plurality of teeth and a plurality of edge segments; the plurality of teeth and edge segments extending from the main body and arranged in a row, there being a gap between each adjacent pair of the teeth, the edge segments alternating with the teeth and bridging the gaps between the teeth, the edge segments being configured and adapted to engage loose fur in a pet's coat as such loose fur extends through the gaps in a manner removing the loose fur from the pet's coat;
   (b) providing a fur ejector portion positioned against the rear face of the main body and including a movable portion with a front edge slidable along and against the back surface of the toothed portion and against the edge segments, the front edge of the fur ejector portion being movable within a first plane between a first position and a second position relative to the toothed portion, the edge segments of the toothed portion being generally between the front edge of the fur ejector portion and tips of the teeth when the fur ejector portion is in the first position;
   (c) providing at least one biasing portion biasing the front edge of the fur ejector portion away from the second position and toward the first position; the biasing portion and the edge of the fur ejector portion being co-planar; wherein the fur ejector portion is configured and adapted to permit fur to pass through the gaps of the toothed portion when the edge of the fur ejector portion is in the first position; and
   (d) providing a handle portion having a longitudinal axis perpendicular to the first plane; the fur ejector portion being sandwiched between the toothed portion and the handle portion to provide that during movement of the edge of the fur ejector portion from the first position to the second position, the front edge slidably moves against the back surface of the toothed portion and against the edge segments.

2. The method of claim 1 wherein the step of providing a toothed portion includes providing the row of the teeth to be straight and the plurality of edge segments to lie within a common plane.

3. The method of claim 1 further comprising holding the handle portion in a manner causing the edge segments to engage loose fur in a pet's coat.

4. The method of claim 3 further comprising providing external force to move the edge of the fur ejector portion from the first position to the second position.

5. The method of claim 4 wherein the step of providing external force includes using a thumb while the handle portion is held by the hand.

6. The method of claim 1 wherein the step of providing a toothed portion includes providing each of at least a plurality of the edge segments of the toothed portion with a leading surface portion and a trailing surface portion, and the trailing surface portion and the leading surface portion of each of the plurality of the edge segments forming an acute included angle.

7. The method of claim 6 including slidably contacting the edge of the fur ejector portion and the leading surface portions of the plurality of the edge segments as the edge of the fur ejector portion moves from the first position to the second position.

8. The method of claim 7 including slidably contacting the edge of the fur ejector portion and at least a plurality of the teeth as the edge of the fur ejector portion moves from the first position to the second position.

9. The method of claim 1 wherein the step of providing at least one biasing portion comprises providing a plurality of bias members between the fixed portion and movable portion.

10. The method of claim 1 further comprising providing a trim cap secured against the forward face of the main body, such that the main body is between the trim cap and the fur ejector portion.

\* \* \* \* \*